Sept. 3, 1940.   E. W. KRUEGER ET AL   2,213,819
SHOCK ABSORBER
Filed May 24, 1938
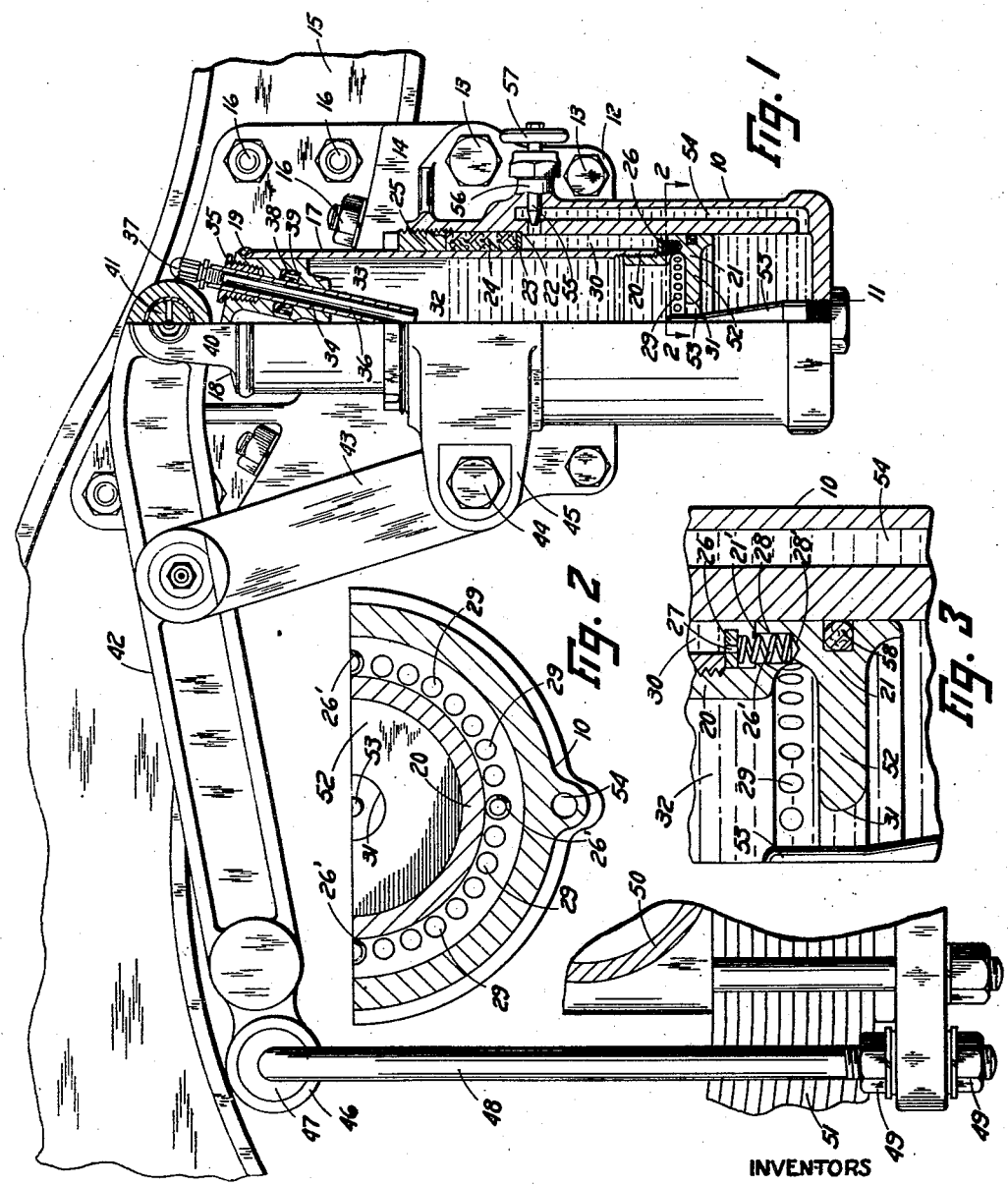
INVENTORS
JOHN F. WALLACE &
ELMER W. KRUEGER
BY
ATTORNEY Patented Sept. 3, 1940

2,213,819

UNITED STATES PATENT OFFICE 2,213,819

SHOCK ABSORBER

Elmer W. Krueger, Cleveland, and John F. Wallace, Shaker Heights, Ohio, assignors to The Cleveland Pneumatic Tool Company, Cleveland, Ohio, a corporation of Ohio Application May 24, 1938, Serial No. 209,712

13 Claims. (Cl. 267—8)

This invention relates broadly to shock absorbing devices, useful in the arts generally, and more particularly for use on automobiles to prevent excessive movement of the vehicle body relative to the axles. This application is a continuation in part of the application Serial No. 125,773, filed February 15, 1937.

One object of this invention is the provision of a shock absorber adapted for use on automobiles and the like, which will efficiently cushion undue movements of the vehicle body relative to the axle.

Another object of this invention is to produce a hydro-pneumatic shock absorber constructed and arranged whereby the road shocks will be cushioned or absorbed pneumatically and the rebound movements will be checked hydraulically, thereby producing an efficient shock absorbing device particularly adaptable for use with motor vehicles such as automobiles, trucks and the like.

Another object of this invention is to produce a shock absorbing device connected to the parts whose movements are to be cushioned in a manner whereby the movements of said parts are transmitted to the absorbing device at a reduced rate of travel, permitting thereby the use of a relatively short unit forming a compact assembly of simple construction which is strong, durable and efficient.

Another object of this invention is to produce a hydro-pneumatic shock absorber including two telescopic cylinders whose relative movements are checked by compressed air and hydraulic fluid stored therein, the shock absorber being equipped with an adjustable valve for controlling the displacement of the hydraulic fluid within the cylinders, thereby making the device applicable for efficiently absorbing shocks on all kinds of vehicles irrespective of the load carried thereby.

Another object of this invention is the production of a shock absorber of the type above referred to including hydraulic fluid conveying passages controlled by an adequate valve mechanism enabling free flow of the fluid during normal rebound movement of the vehicle body relative to the axle, but capable of checking the flow of the fluid through the passages during abnormal conditions of operation, thereby resulting in a shock absorber which will materially increase the riding qualities of the vehicle.

Other objects and advantages more or less ancillary to the foregoing reside in the specific construction and aggroupment of the elements peculiar to this structure, as will become apparent from a more complete examination of this specification.

In the drawing:

Fig. 1 represents a side view of the shock absorber shown partly in section and connected to parts of a vehicle whose relative movements are to be cushioned.

Fig. 2 is an enlarged cross sectional view taken in a plane indicated by line 2—2 in Fig. 1.

Fig. 3 is an enlarged sectional view of a portion of the device shown in Fig. 1.

Referring to the drawing in which like symbols designate corresponding parts throughout the several views, 10 designates a cylindrical casing closed at its lower end by a removable plug 11, and formed with an integral back wall 12 to which may be secured, by bolts 13, a plate or bracket 14. The shape and size of this bracket may be changed to suit different installations. In the drawing it is shown shaped to fit within the side member of a vehicle frame 15 where it is secured by bolts 16.

The cylindrical casing 10 has its upper end open to slidably receive an inner cylinder 17 having its outer end closed by a cover 18 welded thereto as at 19. The inner cylinder has its inner open end internally threaded to receive the shank 20 of a piston 21, which forms an external annular flange or bearing slidably engaging the inner wall of the casing 10. The upper end of the casing 10 is counterbored to provide an annular shoulder 22 forming a rest for a plate 23, which plate supports a plurality of expansible packings 24 mounted between the cylinders in fluid tight engagement therewith. These packings are secured in position by a gland nut 25 threaded in the upper end portion of the casing 10, through which the packings may be compressed to the desired extent, and forming a sliding bearing for the inner cylinder 17.

Slidably mounted on the piston shank 20 between the piston proper and the extreme lower end of the inner cylinder 17, there is a plate or ring valve 26 having small ports 27 extending therethrough and capable of registration with an annular groove 28 formed on the adjacent end wall of the piston 21, which end wall forms a valve seat 21'. The valve 26 is carried by a plurality of equally spaced compression springs 26' mounted within pilot holes 28' formed in the bottom of the groove 28. Through the piston there is provided a plurality of passages 29 materially larger than the ports 27 of the valve 26, which passages open into the groove 28. The valve 26 is located within an annular chamber or compartment 30 existing between the cylinders 10 and 17, and having its ends defined by the plate 23 and the upper end of the piston 21 or valve seat 21'.

The piston 21 is formed with an inner flange 52 having an axial bore 31 extending therethrough and affording communication between the cylinders to form therein a relatively large chamber 32 extending from the lower closed end of the casing 10 to the upper closed end of the inner cylinder 17. Extending through the bore 31 of the inner flange 52, there is a taper pin 53 formed integral with the plug 11, the purpose of which will be explained later.

The cover 18 of the inner cylinder 17 is cast to form an internal protuberance 33 having a bore 34 extending therethrough and threaded at its upper end to receive a threaded split bushing 35. Slidably mounted within the bore 34 there is a tube 36 having its lower end extending into the chamber 32, while its upper end which extends through the bushing 35 is internally threaded to receive an air valve 37. Leakage around the tube 36 is prevented by a U-shaped packing 38 disposed around the tube within an annular recess 39.

The cover 18 is also provided with two upwardly extending parallel ears 40 having a shaft 41 extending transversally thereof. On this shaft, between the ears 40, is pivotally mounted one end of a lever 42. Intermediate its ends, the lever 42 is pivotally connected to one end of a supporting link 43, which has its other end pivotally carried by a shaft or bolt 44. This bolt extends through ears 45 formed on one side of the casing 10. The three pivotal connections above referred to may be of any suitable type designed to limit friction and the deleterious effect thereof. The other end of the lever is formed with one transversally disposed cylindrical boss 46 which is bored to receive a rubber bushing 47 having pivotally mounted therein one end of a connecting rod 48. The other end of the rod is threaded to receive nuts 49 by which the rod may be secured to the vehicle axle 50 or to its component spring 51. Besides the boss 46, the lever 42 may be formed with one or more similar bosses which may be bored at will to suit different installations.

Leading from the lower end of the cylindrical housing 10 into the upper end of the annular compartment 30, there is a passage 54 formed within the wall of the housing 10 and controlled by a needle valve 55 mounted within a boss 56 formed on the housing 10, and operable by a hand wheel or handle 57.

Assuring a fluid tight joint between the piston 21 and the inner wall of the housing 10, there is a packing 58 operatively carried by the piston 21.

Operation: When the shock absorber is installed on a vehicle as shown in the drawing, the load is first removed from the lever 42 by jacking up the spring 51 until the inner cylinder is moved inwardly about one inch from the closed end of the casing 10. Subsequently the air valve 37 is removed and liquid, such as oil or the like, is poured into the chamber 32 through the tube 36 until the latter is filled up. The spring is then again jacked up until the lower end of the inner cylinder 17 engages the closed end of the casing 10, thereby forcing the liquid into the annular compartment 30 while the excessive liquid in the chamber 32 is forced to escape through the tube 36. With the present construction, it is evident that when liquid is poured into the chamber 32, the liquid level can not extend beyond the end of the tube 36, which acts as a gauge to control the amount of liquid which may be admitted into the chamber 32. After the shock absorber has been contracted as above mentioned, the jack is removed from the spring, the air valve again secured to the upper end of the tube 36, and compressed air introduced into the chamber 32 until the inner cylinder assumes the position shown in the drawing or is positioned substantially half way between the ends of its possible stroke.

During actual operation, the road shocks imparted to the axle 50 and spring 51, are transmitted by the lever 42 to the inner cylinder 17. Due to the position of the fulcrum of the lever, which is calculated to produce a two to one ratio between the end movements of the lever, the movement imparted to the spring will be transmitted to the inner cylinder at a reduced rate of travel, thus allowing the possible stroke of the shock absorber to be only one half the length of the possible movement of the spring relative to the frame 15. When the wheels of the vehicle pass over an obstruction or enter a depression in a road so as to cause the springs 51 to close or give and the body of the vehicle to lower, the inner cylinder 17 will move downwardly within the cylinder 10. In this instance the compressed air stored within the upper end of the inner cylinder will be subjected to an additional compression which will check or cushion the downward movement of the inner cylinder 17. As the volumetric capacity of the compartment 30 increases due to the inward movement of the piston 21 relative to the cylinder 10, liquid from the chamber 32 will flow freely into the compartment 30 through the piston passages 29 and around the valve 26, which valve is maintained open relative to the passages 29 by the compression spring 26'.

As the piston 21 reaches the closed end of the outer cylinder, the tapered pin 53 extending through the bore 31 of the piston will gradually reduce the liquid conveying capacity of the bore 31, thereby gradually checking the downward movement of the inner cylinder until the bore 31 is almost completely closed by the pin, in which instance further downward movement of the inner cylinder is prevented by the liquid trapped between the piston 21 and the closed end of the outer cylinder 10.

Subsequently, the energy accumulated in the springs 51 and within the upper end portion of the inner cylinder 17, will cause the rebound or upward movement of the vehicle body relative to the axle 50, which upward movement is transmitted to the inner cylinder 17 relative to the outer cylinder 10. In this instance, the volumetric capacity of the compartment 30 is reduced due to the movement of the piston 21 toward the plate 23, thus compelling the liquid to flow from the compartment 30 into the chamber 32 through the passages 29. The springs 26' carrying the valve 26 are calculated in a manner causing them to maintain the valve 26 open when the liquid from the compartment 30 flows into the chamber 32 at a relatively slow rate of speed, in which instance the combined force of the springs is greater than the pressure exerted on the valve by the flow of the liquid from the compartment 30 into the chamber 32. In other words, when the vehicle is subjected only to small shocks or vibrations encountered when traveling over good roads, the small displacement of the inner cylinder 17 relative to the outer cylinder 10 will not, during the rebound of the vehicle body, reduce the volumetric capacity of the compartment ber, a pressure actuated valve controlling said passage to admit liquid to said chamber freely as the cylinders are moved in telescoping direction, and spring means associated with said valve maintaining it open relative to said passage during certain conditions of operation of said cylinders in the extended direction but enabling movement of the valve into closed position relative to said passage during other conditions of operation of said cylinders in said last direction.

5. In a shock absorber, a pair of telescoping cylinders having liquid stored therein, guiding bearing and packing means between said cylinders, a liquid chamber between said cylinders, a connecting passage through the wall of one of said cylinders communicating with said chamber, a pressure actuated valve controlling said passage to admit liquid to said chamber freely as the cylinders are moved in telescoping direction, spring means associated with said valve maintaining it open relative to said passage during certain conditions of operation of said cylinders in the extended direction but enabling movement of the valve into closed position relative to said passage during other conditions of operation of said cylinders in said last direction, and a restricted orifice to permit escape of the liquid from said chamber during closed position of said valve relative to said passage.

6. In a shock absorber, a pair of telescoping cylinders having liquid and fluid stored therein, means including an orificed member inter-connecting said cylinders and a metering pin slidable through the orifice of said member for controlling the flow of liquid from one cylinder to the other, a chamber between said cylinders, a connecting passage through the wall of one of said cylinders to convey liquid to said chamber when the cylinders are moving in the collapsing direction, pressure responsive valve means capable of at least partly closing said passage when the cylinders are moving in the extending direction, and spring means retarding movement of said valve means into closed position relative to said passage.

7. In a shock absorber, a pair of telescoping cylinders having liquid and fluid stored therein, means including an orificed member inter-connecting said cylinders and a metering pin slidable through the orifice of said member for controlling the flow of liquid from one cylinder to the other, a chamber between said cylinders, a connecting passage through the wall of one of said cylinders to convey liquid to said chamber when the cylinders are moving in the collapsing direction, a pressure responsive valve movable into closed position relative to said passage when the cylinders are moving in the extending direction, spring means retarding movement of said valve into closed position relative to said passage, and a restricted port through said valve communicating with said passage to permit restricted flow of the liquid from said chamber when said passage is closed by said valve.

8. In a shock absorber, a pair of telescoping cylinders having liquid and fluid stored therein, a chamber between said cylinders, a connecting port leading from one of said cylinders to said chamber to convey liquid into said chamber when the cylinders are moving in the collapsing position, pressure responsive valve means to control escape of the liquid from said chamber through said port when the cylinders are moving in the extending direction, and a passageway leading from said chamber to the other cylinder enabling escape of the liquid from said chamber when said cylinders are moving in the extending direction.

9. In a stock absorber, a pair of telescoping cylinders having liquid and fluid stored therein, a chamber between said cylinders, a connecting port leading from the smaller of said cylinders to said chamber to convey liquid into said chamber when the cylinders are moving in the collapsing position, pressure responsive spring mounted valve means to control escape of the liquid from said chamber through said port when the cylinders are moving in the extending direction, a passageway leading from said chamber to the other cylinder enabling escape of the liquid from said chamber when said cylinders are moving in the extending direction, and means for controlling the liquid conveying capacity of said passageway.

10. In a shock absorber, a pair of telescoping cylinders, liquid and fluid in the cylinders, a liquid chamber between the cylinders, a pair of connecting passages leading from said cylinders and opening into said chamber one above the other, and pressure responsive spring supported valve means within said chamber to control the lower of said passageways when the cylinders are moved in the extending direction.

11. In a shock absorber, a pair of telescoping cylinders, liquid and fluid in the cylinders, a liquid chamber between the cylinders, a main and an auxiliary orifice respectively through the wall of one and the wall of the other of said cylinders, and pressure responsive valve means controlling the main orifice to open said orifice when the cylinders are moving in the telescoping direction and to at least partly close said orifice when the cylinders are moving in the extending direction.

12. In a shock absorber, a pair of telescoping cylinders, liquid and fluid in the cylinders, a liquid chamber between the cylinders, a main and an auxiliary orifice respectively through the wall of one and the wall of the other of said cylinders, pressure responsive valve means controlling the main orifice to open said orifice when the cylinders are moving in the telescoping direction and to at least partly close said orifice when the cylinders are moving in the extending direction, and means for selectively controlling the liquid conveying capacity of the auxiliary orifice.

13. In a shock absorber, inner and outer telescoping cylinders, liquid and fluid in the cylinders, a piston carried by the inner end of the inner cylinder, a liquid chamber between said cylinders above said piston, a pair of passages leading from said chamber and opening into said cylinders one above and the other one below said piston irrespective of the position of said cylinders relative to one another, and pressure responsive valve means controlling one of said passages to enable freer flow of the liquid through said passage in one direction than in the other.

ELMER W. KRUEGER.
JOHN F. WALLACE.

30 fast enough to create sufficient pressure on the liquid within the compartment 30 capable of overcoming the combined force of the springs 26'. Consequently, under normal conditions of operation, the valve 26 will remain open and the free flow of the liquid from the compartment 30 into the chamber 32 will not check the small rebound of the vehicle body, thereby enabling the springs 51 to resiliently carry the vehicle body without interference. However, when the vehicle is subjected to more pronounced shocks, the rebound movements resulting therefrom will tend to move the inner cylinder upwardly at a greater rate of speed, thereby causing a more rapid reduction in the volumetric capacity of the compartment 30 and a consequential increase of pressure on the liquid contained in the compartment 30, which increase of pressure is now sufficient to overcome the combined force of the springs 26' and cause the valve 26 to move into engagement with the valve seat 21'. In this instance, if the needle valve 55 is closed relative to the passage 54, the liquid from the compartment 30 will be compelled to flow into the chamber 32 via the ports 27 of the valve 26, which ports are of a combined area calculated to retard the flow of the liquid therethrough, thereby checking the upward movement of the inner cylinder 17 relative to the outer cylinder 10 and consequently the rebound movement of the vehicle body with respect to the axle.

When the vehicle carries an excessive load, it has been found advantageous to allow a freer flow of the liquid from the compartment 30 into the chamber 32. To that end, the needle valve 55 may be rotated through its handle 57 into a more or less complete open position relative to the passage 54, thereby enabling the liquid to flow from the compartment 30 into the chamber 32 through the additional passage 54. Through the needle valve 55, the liquid conveying capacity of the passage 54 may be varied at will, thereby controlling the speed of the upward movement of the inner cylinder 17 relative to the outer cylinder 10, and resulting in a shock absorber wherein the effectiveness of the rebound check is adjustable at will.

By loosening the split bushing 35, the tube 36 may be raised or lowered relative to the inner cylinder 17 to regulate the liquid level within the chamber 32, thereby controlling the amount of liquid which can be admitted into the chamber as well as controlling the volumetric capacity of the air receiving portion of the chamber 32, which portion is hereinafter designated as the pneumatic chamber. When the shock absorber is intended for use with passenger vehicles such as automobiles, the tube 36 will be positioned substantially as shown in the drawing to provide a pneumatic chamber of large volumetric capacity, permitting thereby slight road shocks to be efficiently cushioned by the shock absorber. When the device is intended for use with heavy duty vehicles such as trucks and the like, the tube 36 may be raised to reduce the volumetric capacity of the pneumatic chamber, and cause the compressed air admitted therein to reach a higher pressure necessary for efficiently absorbing the heavy load and shocks transmitted to the axle.

From the foregoing description, it is evident that with the present construction the road shocks are primarily absorbed by the compressed air within the pneumatic chamber, and that the rebounds are checked by the restricted flow of the liquid from the annular compartment 30 to the chamber 32, thus resulting in an efficient hydro-pneumatic double acting shock absorber of simple construction.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A shock absorber comprising a pair of telescopically mounted cylinders, a chamber and a compartment between the outer ends of said cylinders, communicating means between said chamber and compartment, compressed fluid and liquid within said chamber for checking the telescopic movement of said cylinders in one direction, liquid within said compartment adapted to flow freely into said chamber during telescopic movement of said cylinders in the other direction as long as the rate of speed of said last movement remains below a predetermined maximum, means automatically reducing the rate of flow of the liquid from said compartment into said chamber for checking said last movement when the rate of speed thereof exceeds said predetermined maximum, and means for selectively controlling the reducing rate of said flow.

2. In a shock absorber comprising a pair of telescoping cylinders, a piston on the inner end of the inner cylinder, an orifice through said piston, compressible fluid and liquid stored within said cylinders the former subjected to compression upon displacement of the latter through said orifice during inward movement of said cylinders, a metering pin slidable through said orifice for gradually reducing the liquid conveying capacity thereof toward the end of said inward movement, a compartment between said cylinders having liquid stored therein, passages leading from said compartment into said inner cylinder above said piston, a valve movable into open or closed position relative to said passages, and spring means maintaining said valve in open position during certain conditions of operation but enabling movement of said valve into closed position during other conditions of operation.

3. A shock absorber comprising a pair of telescoping cylinders, a piston on the inner end of the inner cylinder, an orifice through said piston, liquid and compressible fluid stored within said cylinders, the former being compelled to flow through said orifice during inward movement of said cylinders for compressing the latter, a compartment between said cylinders having liquid stored therein, a passage leading from said compartment into the inner cylinder above said piston, a valve movable into open or closed position relative to said passage, spring means maintaining said valve open during certain conditions of operation but enabling it to close during other conditions of operation, and valve means automatically operative only toward the end of said inward movement for reducing the motive fluid conveying capacity of said orifice.

4. In a shock absorber, a pair of telescoping cylinders having liquid stored therein, guiding bearing and packing means between said cylinders, a liquid chamber between said cylinders, a connecting passage through the wall of one of said cylinders communicating with said cham-

CERTIFICATE OF CORRECTION.

Patent No. 2,213,819. September 3, 1940.

ELMER W. KRUEGER, ET AL.

It is hereby certified that error appears in the printed specification of the above numbered patent requiring correction as follows: Page 4, second column, line 15, claim 9, for the word "mounted" read --supported--; and that the said Letters Patent should be read with this correction therein that the same may conform to the record of the case in the Patent Office.

Signed and sealed this 5th day of November, A. D. 1940.

Henry Van Arsdale,
Acting Commissioner of Patents.

(Seal)